Dec. 24, 1935.   J. F. MacINDOE   2,025,396
LUBRICANT CONTROL DEVICE
Original Filed Jan. 21, 1930
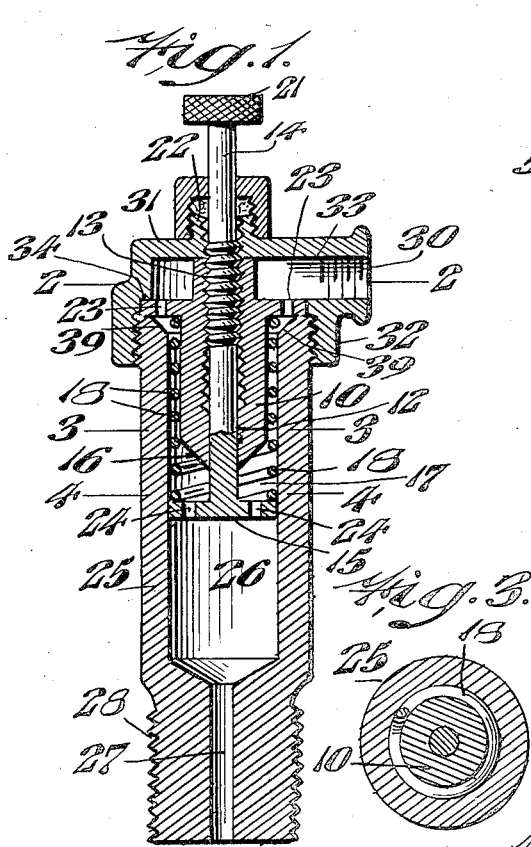
INVENTOR.
JOHN FRANKLIN MacINDOE.
BY Robert M. Barr,
ATTORNEY.

Patented Dec. 24, 1935

2,025,396

UNITED STATES PATENT OFFICE 2,025,396

LUBRICANT CONTROL DEVICE

John Franklin MacIndoe, Philadelphia, Pa.

Application January 21, 1930, Serial No. 422,302
Renewed February 15, 1934

3 Claims. (Cl. 138—42)

The present invention relates to lubricating devices and more particularly to a control means for regulating the quantity of grease or oil which discharges from a lubricator in a given time.

Some of the objects of the present invention are to provide an improved means for controlling the flow of lubricant from a lubricator or in a lubricating system; to provide a control for lubricating devices which is manually operable at will to vary the quantity of lubricant flowing through the control device; to provide a control for lubricating devices which is simple in construction, efficient in operation and which can be set for a predetermined amount of lubricant flow; to provide a positive means for insuring a constant predetermined quantity of lubricant being delivered in a given time; to provide a lubricant control device wherein a coil spring serves as a control for the lubricant; to provide a manually settable control for lubricators or lubricating systems which is applicable for use in nipple pressure fittings, pressure controlled grease cups and other devices wherein a constant regulated supply of lubricant is required and to provide other improvements as will hereinafter appear.

In the accompanying drawing, Fig. 1 represents a sectional elevation of a pressure fitting equipped with a control device embodying one form of the present invention; Fig. 2 represents a section on line 2—2 of Fig. 1; Fig. 3 represents a section on line 3—3 of Fig. 1; Fig. 4 represents a section on line 4—4 of Fig. 1; Fig. 5 represents a sectional elevation of a pressure operated lubricator equipped with a control of the present invention; and Fig. 6 represents a section on line 6—6 of Fig. 5.

Referring to the drawing one form of the present invention consists of a body 10 preferably of cylindrical shape which carries at one end a radially disposed circumferential flange 11 and has an axially disposed bore 12 therethrough, one portion of which is internally threaded as indicated at 13, to receive a stem 14 of an axially adjustable guide disc 15. This guide disc 15 is located on the outside of the member 10 at the opposite end from the flange 11 and forms with the converging end 16 of the body 10, a circumferential chamber 17 into which lubricant enters as will be later explained. Interposed between the flange 11 and the disc 15 there is a coil spring 18 which encircles the body 10 in contact relation therewith and is arranged to be placed under compression as required by the movement of the disc 15 toward and away from the body 10. This adjusting movement of the disc 15 takes place through the turning movement of the stem 14 by manually operating a knurled head 21 on the projecting end of the stem 14. Leakage around this projecting end of the stem 14 is prevented by any suitable form of a stuffing box 22 although this latter is not always required since in some instances the stem terminates within a closed grease cup.

In order to direct grease or oil to the inlet end of the spring 18, the flange 11 is provided with a plurality of through ports 23 each of which is spaced radially a greater distance from the stem 14 than the spring 18 so that this lubricant, after passing through the ports 23 can be directed against the side of the spring in close proximity to the first convolution thereof. At the opposite end of the device, the disc 15 is provided with a plurality of discharge ports 24 each of which is located a less radial distance from the stem 14 than the spring 18 in order that the lubricant being fed can pass through the spring into the chamber 17.

From the foregoing it will be evident that if the body 10 is held fixed against rotation while the stem 14 is rotated, the disc 15 can be fed toward or away from the body 10 at will and in the one case increases the compression on the spring 18 and in the latter case decreases the compression of the spring 18 and in this way, varies the size of the helical passage formed by the spring and through which the lubricant passes to the discharge point. In the assembly of this device, provision must be made for anchoring the body 10 so that the turning thrust of the threaded stem 14 causes the latter to be fed axially in the desired manner.

The foregoing generally describes the control device of the present invention and it will be evident therefrom that its use is varied and that it can be readily assembled in various structures for control purposes. Thus in Fig. 1, it is shown as a part of a pressure grease fitting wherein the body 25 of the fitting is provided with a bore 26 of a diameter to snugly receive the disc 15 of the control device and of a length sufficient to provide an adequate space for the ordinary travel of the disc 15 and this space communicates with a reduced bore forming a discharge passage 27 axially through the end of the fitting. This end of the fitting 25 is the usual shank end of such a fitting and is provided with an external thread 28 for attachment to a part to be lubricated.

For closing the end of the fitting 25 to provide a lubricant receiving inlet 30 and also to clamp the flange 11 fast to the fitting to prevent any relative turning movement, a head 31 is provided having an internally threaded boss 32 for engaging the externally threaded end of the fitting 25. This head provides a receiving passage 33 in communication with the lubricant inlet and into which the ports 23 open. It should also be noted that this head 31 has an internal circumferential shoulder 34 which is brought into contact clamping relation with the face of the flange 11 and holds the latter and the body 10 firmly in place.

In connection with the ports 23 as assembled, it should be noted that since the bounding wall of the bore 26 practically seats against the sides of the spring convolutions, provision has to be made for the lubricant to exit from the ports 23 against the sides of the spring 18 and this is preferably accomplished by counterboring the end of the fitting 25 as shown at 39 to provide downwardly slanting guides leading to the sides of the spring convolutions.

In the form of the invention shown in Figs. 5 and 6 the controlled device is shown located in an axial bore 35 formed in an externally threaded shank 36 of an automatically feeding lubricator which is designed to be attached to a bearing to be lubricated. This lubricator consists of a cup body 37 of larger diameter than the shank 36 and forming a chamber 38 into which the lubricant, such as grease, is injected by way of an inlet 40 in which is located a nipple 41 of the usual outwardly-closing check valve type, which is arranged to removably receive the fitting of a grease gun or other source of lubricant supply.

It will be noted that in this construction the flange 11 seats upon the bottom of the chamber 38 and has two diametrically opposite edge notches 42 for respectively receiving inwardly disposed lugs 43 which are formed integral with the body 37. This provides a means for preventing relative turning movement of the flange with its attached body 10 with respect to the cup body 37.

The hollow barrel or body 37 is here shown as its upper end open but arranged to be closed by a packing ring 44 which is compressed in place by a threaded closure cap 45 which fits over the end of the body 37 and includes a stuffing box structure 46 for encircling the end of a plunger rod 47 which extends exterior of the body 37 and terminates in a knurled head 48 so that the parts can be manually adjusted. This rod 47 is connected to a piston 50 which is slidingly mounted in the chamber 38 and in the present instance consists of a plate 51 clamped between an upper cup washer 52 and a lower cup washer 53 by means of screws 54 or other fastening means for connecting the piston to the rod 47.

This piston 50 is arranged to slide upwardly under the pressure of the supplied lubricant in order that the chamber 38 can be filled and a reserve supply of lubricant thus made possible. Movement of the piston 50 in the opposite direction to discharge the lubricant from the chamber 38 preferably takes place by pressure admitted by way of a pipe 55 leading into the space between the piston 50 and the capped end of the body 37. Preferably this pressure inlet is adjacent to the end of the non-working stroke of the piston 50 in order to obtain a full working stroke when pressure is admitted.

In order to adjust the disc 15 to vary the space between the convolutions of the control spring 18, the stem 14 which is threaded into the body 10 extends upward axially of the chamber 38 and enters a bore 56 in the rod 47 and it should be noted that this bore 56 as well as the stem 14 are square in cross section and have a free sliding fit one with the other. This allows the piston 50 to reciprocate relative to the stem 14 without interfering in any way with the set position of the controlled member 10 and any turning movement of the rod 47 will be transmitted to the stem 14 and thereby causes it to feed axially of the body 10 to vary the adjustment of the disc 15 in the manner required. The flange 11 of the controlled member has its supply ports 23 opening into a circumferential chamber 57 formed by counterboring the upper end of the bore 35 in order to direct the supply of lubricant readily against the sides of the spring 18. The relative diameters of the body 10 and the bore 35 are such as to snugly receive the spring 18 while allowing it to be compressed or expanded at the will of the operator.

Where the control device of the present invention is used with a barrel or cup body 37 it will be understood that the chamber in this cup body serves first, as a storage or emergency reserve of grease for supplying the bearings in case the main pressure supply should fail, or during such time as the refilling of the main grease control takes place. This construction also makes it possible to use the unit as a separate lubricant supply means which is filled by the attachment of a grease gun to the nipple 41. Thus the nipple 41 becomes an emergency attachment for applying pressure to expel grease quickly to a bearing which needs it and with a greater pressure than would be supplied by the main line pressure.

Having thus described my invention, I claim:

1. In a lubricant control device having a casing with an inlet and an outlet connected by a bore, a body member mounted in said bore and having a portion spaced from the sides of said bore to provide therebetween an annular passage connecting said inlet and said outlet, a coil spring arranged in contact with the walls of said annular passage to provide a helical path for the lubricant, said spring bearing at one end against a portion of said body member, a member bearing against the other end of the spring, and adjusting means connected to said member and threaded in said body member for compressing said spring to vary the volumetric capacity of the helical path.

2. In a lubricant control device, a hollow cylindrical casing member having an inlet and an outlet, a helical spring within the inner wall of said casing, a body member arranged within said spring and in contact with the convolutions thereof, said body member having a rim portion at one end serving as an abutment for one end of said spring, the inner wall of said casing, the outer wall of said body member, and the convolutions of said spring providing a helical passage for the discharge of lubricant, and means for compressing said spring to vary the volume of lubricant discharged through said helical passage, said means including a member slidable within said casing member and abutting against the other end of said spring, and means for actuating said slidable member to compress said spring toward the rim portion of the body member.

3. In a lubricant control device, a hollow cylindrical casing member having an inlet and an outlet, a helical spring within the inner wall of said casing, a body member arranged within said spring and in contact with the convolutions thereof, said body member having a rim portion at one end serving as an abutment for one end of said spring, the inner wall of said casing, the outer wall of said body member, and the convolutions of said spring providing a helical passage for the discharge of lubricant, and means for compressing said spring to vary the volume of lubricant discharged through said helical passage, said means including a member slidable within said casing member and abutting against the other end of said spring and a rod connected to said slidable member and threaded in said body member for actuating said slidable member to compress the spring toward the rim portion of the body member.

JOHN FRANKLIN MacINDOE.